Nov. 7, 1939.  L. C. BROECKER  2,178,828
DUST CAP FOR TIRE VALVES
Filed Jan. 12, 1937
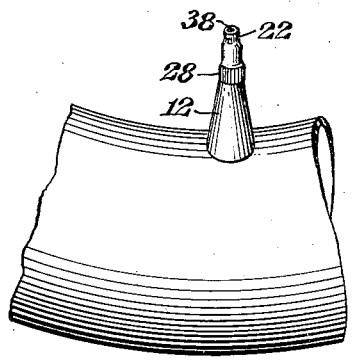
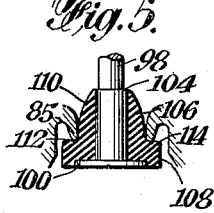
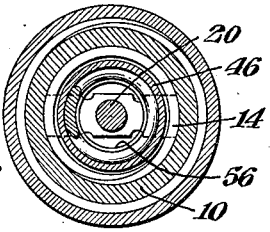
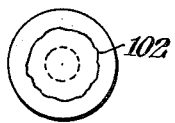
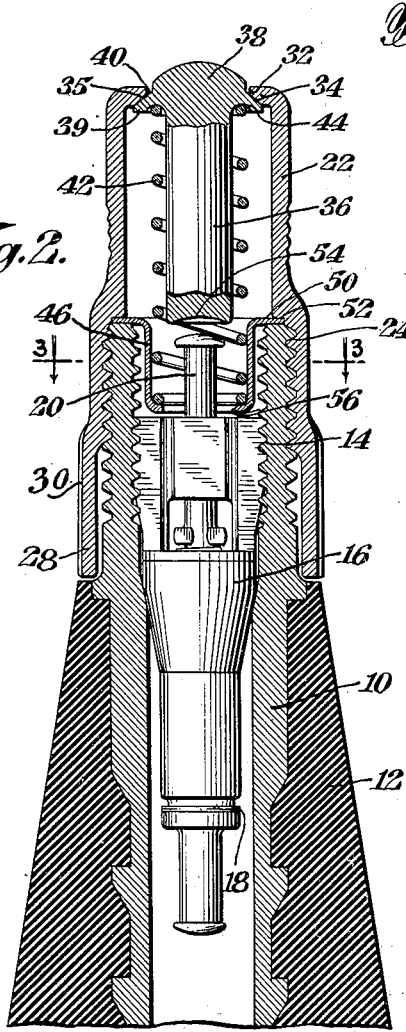
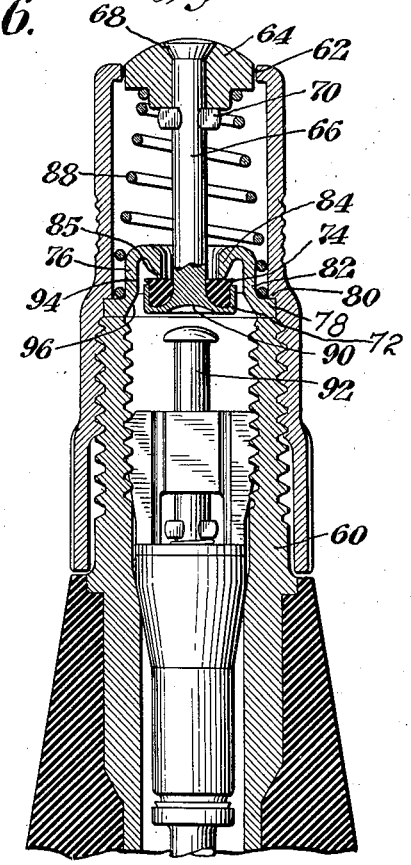
INVENTOR
Lewis C. Broecker
BY
Kenyon & Kenyon
ATTORNEYS Patented Nov. 7, 1939

2,178,828

UNITED STATES PATENT OFFICE 2,178,828

DUST CAP FOR TIRE VALVES

Lewis C. Broecker, Bridgeport, Conn., assignor to Bridgeport Brass Company, Bridgeport, Conn., a corporation of Connecticut Application January 12, 1937, Serial No. 120,174

6 Claims. (Cl. 251—137)

This invention relates to improvements in dust caps for tire valves and the like.

In the known dust caps in use for tire valves, it is necessary to remove the dust cap whenever it is desired to inflate or deflate a tire or whenever it is desired to read the pressure in a tire with an air pressure gauge. It takes time to remove the usual dust cap and the removal is quite troublesome and annoying. Frequently these dust caps are lost and dust and dirt and the like get into the valve inside of a tire and interfere with the operation of the valve inside.

In my invention, I provide a dust cap having an opening with a pin mounted within the dust cap and resiliently held against the opening so that a tire may be inflated or the pressure gauged by directly applying the device to my dust cap and without removing the dust cap from the tire valve. The pin is depressed when a tire is to be inflated, for example, and this pin depresses the usual center pin in a valve inside. A dust-proof and dirt-proof construction is provided.

In the drawing:

Fig. 1 represents a perspective view of a part of a tire or tube having a valve stem with my dust cap attached thereto;

Fig. 2 represents a longitudinal cross section taken through a device made according to my invention;

Fig. 3 represents a horizontal cross section taken substantially on line 3—3 of Fig. 2; and Fig. 4 represents a longitudinal cross section of a modification of my invention; and Fig. 5 represents a longitudinal cross section of an alternative structure of pin and valve member;

Fig. 6 represents a bottom plan view of the pin and valve member shown in Fig. 5.

Referring now to the drawing, the reference character 10 designates the metal stem insert which, in the case of the so-called "rubber stems", has its lower portion surrounded by or embedded in rubber, as at 12. The stem insert is internally threaded at its upper end as at 14 to receive the usual or standard valve inside 16 provided with a valve 18 at its lower end. This valve may be opened by depressing or pushing the pin 20, the end of which extends to near the top of the stem insert 10. The metal stem insert is externally threaded at its upper end to receive a dust cap 22 made according to my invention. The dust cap is in the form of a sleeve and is internally threaded at 24 to engage the external threads of the stem insert 10. The skirt 28 of the dust cap is elongated to cover part of the metal stem insert, and the skirt extends to the rubber portion 12 in order to provide a relatively tight joint to keep out dust, dirt and water as well as to give a pleasing appearance to the entire device. The skirt 28 is knurled at 30, and its inner surface is preferably smooth and not threaded.

The dust cap 22 is provided at its upper end with an opening 32. The inturned edge 34 which defines the opening 32 has its inner surface bevelled or countersunk as at 35. Pin 36 is resiliently mounted within the dust cap and its head 38 is positioned within the opening 32. The head 38 is provided with a lateral annular flange 39 which is preferably bevelled or inclined, as at 40, to fit the bevelled surface 35 about the opening in the dust cap, and thus form a dust-proof water-proof seal. The opening 32 is normally closed tightly by the flange 39 on the head of the pin 36, the flange 39 being held against the bevelled portion 34 of the dust cap by means of the coil spring 42 which surrounds the pin 36. The upper end of the coil spring is positioned within the cut-away portion or groove 44 which is provided on the lower face of the head 38, and the lower end of the coil spring engages and is held in place by the flanged cup 46. The top lateral flange 50 of the cup fits tightly in the dust cap and is pressed into place against shoulder 52 formed on the inside of the dust cap. This cup serves to hold spring 42 and pin 36 in place in the dust cap, before, as well as after, the dust cap is screwed in place on the valve stem. When the dust cap is screwed onto the stem, the shoulder 52 forces the flange 50 against the upper end of the metal stem insert 10 whereby the cup, the spring 42 and the pin 36 are securely held in place in the dust cap.

The lower end of the pin 36 is hollowed out or concaved slightly, as at 54, and is adapted to engage and depress the center pin 20 of the valve core, when a conventional air chuck or an air gauge is applied to the end of the dust cap. The lower end of the pin 36 is positioned and held centrally of the dust cap so as to be in line with the center pin 20 of the conventional valve core or inside. The means for holding the pin 36 centrally comprises the spring 42 and the flanged cup 46. The upper end 38 of the pin 36 is loosely centered in the dust cap by the flange 39 when the pin 36 is being depressed during inflation of the tire or gauging of the pressure within the tire.

The bottom of the flanged cup 46 has an opening 56 to permit the center pin 20 to extend into the cup in position to be engaged by pin 36. This opening also permits air to freely pass the valve inside during inflation of the tire.

In Fig. 4, I have shown another form of my invention using a standard form of valve inside and valve stem. In this form, the dust cap is threaded on the stem insert 60 in the same manner, as the form of my invention previously described. The dust cap at its upper end is provided with an opening 62 within which is positioned a head or plug 64 which is secured or connected to pin 66. The head or plug 64 is secured to the pin 66 by upsetting the end of the pin 66 slightly, as shown at 68. Ears 70 struck up from the pin 66 prevent the head 64 from being pushed too far onto the pin 66. At its lower end, the pin 66 is provided with a cup shaped member 72, which contains a washer 74 made of soft pliable material, such as rubber or the like, and forms the valve member which cooperates with a valve seat, described hereinafter.

A valve seat member 76 cooperates with the washer 74 and is provided with a lateral flange 78 which is held against the top of the metal stem insert 60 by the shoulder 80 formed on the interior of the dust cap. The flange 78 is tightly held in the dust cap by being pressed into place against the shoulder 80 to hold the spring (later to be described) and the pin 66 in place in the dust cap, before, as well as after, the dust cap is screwed in place on the valve stem. Valve seat member 76 has a cylindrical portion 82 and an inwardly directed annular flange portion 84 which is spaced from and surrounds the lower portion of the pin 66 and terminates in a rather sharply defined circular edge 85, which forms a valve seat for the valve member 74. The annular flange 84 also defines an opening through the center of the device to receive pin 66 and to permit passage of the air through the tire valve when it is desired to inflate the tire or to gauge the pressure in the tire. The member 76 is made of relatively soft material such as copper and the flange 78 serves as a gasket when pressed against the end of the valve stem insert 60 so as to insure an air-tight joint. The relatively soft metal of the flange 78 will readily conform to any slight irregularity of the end of the metal stem insert 60. This member 76 may be plated or coated with a still softer metal such as lead or tin to facilitate making an air-tight joint against the end of the stem insert 60.

The head or plug 64 has a fairly close fit within the opening 62 of the dust cap and serves to prevent most of the dust and dirt from entering the cap and also to center the pin 66. When the plug or head 64 is depressed by the air chuck during inflation, the air is free to pass around the head because the diameter of the dust cap is greater than the width of the head or plug 64.

The pin 66 is normally held in the position shown in Fig. 4 by the spring 88, which at its upper end, abuts the lower face of the head or plug 64, and, at its lower end, abuts or rests upon the upper face of the flange 78 on the member 76. In this way the washer or valve 74 is held against the annular valve seat 85 to maintain an air-tight joint. The lower face of the cup-shaped member 72 is slightly hollowed out or concaved, as at 90, to engage and receive the center pin 92 of the valve inside, when plug 64 and stem 66 are depressed.

When the plug or head 64 is depressed by an air chuck or air gauge, cup-shaped member 72 and washer 74 are pushed away from the valve seat 85 to allow free passage of air through the opening in the valve seat member 76. During this downward movement the bottom 90 of the cup-shaped member pushes against the head of the center pin 92 to open the valve core and permit the passage of air through it.

Cup-shaped member 72 and washer 74 are centered on valve seat 85 and with relation to the opening through the member 76, by the inner wall 94 of the member 76. The tapered surface 96 of member 76 serves to guide the cup-shaped member 72 into its proper position in the cylindrical portion 82 of the member 76, when the valve in the dust cap is closing.

The operation of the device shown in Fig. 2 is as follows. When it is desired to inflate a tire, or gauge the pressure in a tire, an air chuck or air gauge is placed on top of the dust cap 22 and forced against head 38. This action forces the head 38 and pin 36 downward against the action of the spring 42. Downward movement of the pin 36 forces the center pin 20 of the valve core downwardly to open the valve 18 and to permit air to move past the valve 18 and the valve core. When the air gauge or air chuck are removed from the housing or dust cap 22, the pin 36 is moved back to the position shown in Fig. 2 by the spring 42 and the bevelled flange 39 on the head 38 engages the bevelled or counter-sunk surface 40 surrounding the opening in the dust cap 22. When the pin 36 moves upwardly under the action of spring 42, the center pin 20 is raised by its spring to move the valve core and to close the valve 18.

The operation of the form of the device shown in Fig. 4 is similar to that described in connection with the form of the device shown in Fig. 2. In this form, however, a valve is provided within the dust cap on the lower end of the pin 66. When it is desired to inflate a tire having this form of dust cap, the head or plug 64 is depressed by an air chuck to open the valve formed by the washer 74 and annular member 84 to permit the passage of air past this valve. The downward movement of the pin 66 depresses the center pin 92 in the valve core to permit air to be forced into the tire. When the tire is inflated, the air chuck is removed, the valve in the valve stem is closed by its spring, and the spring 88 raises the pin 66 to engage washer 74 with seat 85 to form an air-tight joint.

Fig. 5 discloses an alternative construction of pin and valve designed to take the place of pin 66, Fig. 4, and its associated parts. The pin is designated by the reference character 98 and has at its lower end the flattened head or flange portion 100, the shoulder of which is preferably roughened as indicated at 102. The lower portion of the pin is slightly greater in diameter than the upper portion, this change in diameter being defined by the shoulder 104. This shoulder in the molding operation forms the limit for the rubber valve member 106. This valve member is in the form of a rounded frusto-conical member projecting upwardly from a flattened annular base portion 108 which is greater in diameter than the head or flange 100 and receives the same in its lower surface. This form of valve member provides a rounded tapering surface 110 which continues through the rounded shoulder 112 to merge into the flattened and rounded upper surface 114 of the portion 108 of the valve member. When in seating engagement with the valve seat 85 the tapered portion 106 of the rubber element fits within and through the opening in the valve seat member 76, the seating edge 85 of which engages the rubber member at the juncture between the flat horizontal surface 114 and the inclined surface 110 so as to make an air-tight joint. Of course the tapered portion 106 insures the guiding of the parts into proper position relative to each other.

My dust cap is not restricted to tire valves but may be used with other valves on inflatable articles.

It is to be understood that the foregoing examples are given only by way of illustration and that the same may be modified in many particulars without departing from the spirit of my invention.

What I claim is:

1. A dust cap adapted for use with tire valve stems and the like having valve insides, said cap including a hollow body provided with an opening in one end and an internal shoulder, a pin movably mounted in said body and having a head of substantially the same size as said opening, valve closure means associated with said pin comprising a valve member on said pin, a cup shaped member having a lateral annular flange at one end held within said body and pressed against said shoulder, said cup shaped member also having a vertically extending cylindrical portion adjoining said lateral annular flange and an inwardly downwardly directed annular flange at its opposite end terminating in a sharply defined circular edge serving as a valve seat, and spring means surrounding said cylindrical portion for normally moving said head into said opening and for closing said closure means.

2. In combination with a valve stem having valve insides operated by a core, a dust cap provided with an opening and an internal shoulder, a pin mounted within said dust cap and having a head extending into said opening in said dust cap, said pin being provided with valve closure means, a cup shaped member having a lateral annular flange at one end held within said body and pressed against said shoulder, said cup shaped member also having a cylindrical portion adjoining said lateral annular flange and an inwardly, downwardly directed annular flange at its opposite end terminating in a sharply defined circular edge serving as a valve seat for said valve closure means, and a spring within said dust cap surrounding said cylindrical portion and extending between said lateral annular flange and said head for normally holding said valve closure means in closed position against the valve seat, said pin being adapted to be depressed to open said valve closure means when air is to be forced through the valve stem and to contact and move the core in the valve stem to open position.

3. A device of the character described, including a dust cap adapted to be secured to a tire valve stem having valve insides operated by a center pin, said dust cap having an opening in one end and an internal shoulder, a pin movably mounted in said dust cap and having a head fitting within said opening, a cup shaped member held within said dust cap, said cup shaped member being provided with a flange pressed against said shoulder, a cylindrical portion and an inwardly downwardly directed flange provided with a sharply defined valve seat, said pin having a valve adapted to cooperate with said valve seat, and a spring between said head and said first named flange and surrounding said cylindrical portion for normally seating said valve on said valve seat, said valve having a concave bottom adapted to engage and depress the center pin of said valve insides in a valve stem when said movably mounted pin is depressed.

4. A device of the character described including a dust cap adapted to be secured to a tire valve stem having valve insides operated by a center pin, said dust cap having an opening in one end and an internal shoulder, a pin movably mounted in said dust cap and having a head fitting within said opening, a cup shaped member held within said dust cap, said cup shaped member being provided with a flange abutting said shoulder, a cylindrical upwardly extending portion adjacent said flange and an inwardly downwardly directed flange provided with a sharply defined valve seat, said pin having a cup-shaped member at its lower end, packing material in said cup-shaped member to form a valve adapted to cooperate with said valve seat, and a spring between said head and said first named flange and surrounding said cylindrical portion for normally seating said valve on said valve seat, said second named cup shaped member having a concave bottom adapted to engage and depress said center pin when said movably mounted pin is depressed.

5. A device of the character described including, in combination a dust cap adapted to be secured to a tire valve stem, said dust cap having an opening in one end and an internal shoulder, a pin movably mounted in said dust cap and fitting within said opening, a cup shaped member held within said dust cap and having a flange abutting said shoulder, a cylindrical portion and an inwardly downwardly directed flange provided with a sharply defined valve seat, said pin having a valve member secured at its lower end, said valve member being formed of resilient material and having a part of frustoconical shape with a horizontally extending surface portion adapted to engage said valve seat, and resilient means between said head and said first named flange and surrounding said cylindrical portion to normally seat said valve member on the valve seat.

6. A dust cap for use with tire valve stems and the like having valve insides, said cap including a hollow body provided with an opening in one end and an internal shoulder, a pin movably mounted in said body and having a head of substantially the same size as said opening, valve closure means associated with said pin comprising a valve member on said pin, a cup shaped member having a lateral annular flange at one end pressing against said shoulder, a vertically extending cylindrical portion and an inwardly downwardly directed annular flange portion at its opposite end provided with a sharply defined circular edge serving as a valve seat, and spring means surrounding said cylindrical portion and extending between said lateral annular flange and said head for normally moving said head into said opening and for pressing said valve member against said valve seat.

LEWIS C. BROECKER.